US011809534B2

(12) United States Patent
Watanabe et al.

(10) Patent No.: US 11,809,534 B2
(45) Date of Patent: Nov. 7, 2023

(54) ROLE DESIGN ADVISOR (71) Applicant: INTERNATIONAL BUSINESS MACHINES CORPORATION, Armonk, NY (US)

(72) Inventors: Yuji Watanabe, Chuouku (JP); Ruriko Kudo, Saitama (JP); Hirokuni Kitahara, Sumida-ku (JP); Kugamoorthy Gajananan, Toshima-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 17/237,734

(22) Filed: Apr. 22, 2021

(65) Prior Publication Data
US 2022/0342965 A1 Oct. 27, 2022

(51) Int. Cl.
*G06F 21/31* (2013.01)
*G06F 9/50* (2006.01)
(Continued)

(52) U.S. Cl.
CPC .......... *G06F 21/316* (2013.01); *G06F 9/5072* (2013.01); *G06F 9/5077* (2013.01);
(Continued)

(58) Field of Classification Search
CPC .... G06F 21/316; G06F 9/5072; G06F 9/5077; G06F 11/3438; G06F 21/45;
(Continued)

(56) References Cited

U.S. PATENT DOCUMENTS 10,122,757 B1 * 11/2018 Kruse ..................... H04L 63/10
10,425,437 B1 * 9/2019 Bog ....................... H04L 67/306
(Continued)

FOREIGN PATENT DOCUMENTS

CN  106656592 B  2/2020

OTHER PUBLICATIONS

Mell et al. "The NIST Definition of Cloud Computing", NIST Special Publication 800-145, Sep. 2011, 7 pages.
(Continued)

*Primary Examiner* — Darren B Schwartz
(74) *Attorney, Agent, or Firm* — Tutunjian & Bitetto, P.C.; Robert Richard Aragona (57) ABSTRACT

A system for controlling access to cluster resources is provided. The system includes one or more processors; and memory operatively coupled to the one or more processors, wherein the one or more processors and the memory form a cluster of computer resources that includes an admission controller configured to receive requests and determine if the request is authorized, a request history database that stores the request information received by the admission controller from a plurality of users, a role design advisor that is configured to adjust permissions for the plurality of users based on a pattern of usage identified from the request history database, and an alert system that communicates an alert to an administrator that a request outside the pattern of requests for the user has been received by the admission controller, wherein the admission controller, request history database, and role design advisor control access to the cluster resources.

20 Claims, 7 Drawing Sheets

(51) Int. Cl.
  *G06F 11/34* (2006.01)
  *G06F 21/45* (2013.01)
  *G06F 21/60* (2013.01)
(52) U.S. Cl.
  CPC .......... *G06F 11/3438* (2013.01); *G06F 21/45* (2013.01); *G06F 2209/505* (2013.01); *G06F 2221/2141* (2013.01); *G06F 2221/2145* (2013.01)
(58) Field of Classification Search
  CPC ....... G06F 2209/505; G06F 2221/2141; G06F 2221/2145; G06F 21/604
  See application file for complete search history.

(56) References Cited

U.S. PATENT DOCUMENTS

| | | | |
|---|---|---|---|
| 10,567,535 B2 | 2/2020 | Brown et al. | |
| 10,666,657 B1* | 5/2020 | Threlkeld | H04L 9/0643 |
| 10,931,682 B2* | 2/2021 | Ezra | H04L 63/102 |
| 10,944,758 B1* | 3/2021 | Nagargadde | G06F 21/6218 |
| 10,986,131 B1* | 4/2021 | Kruse | H04L 63/10 |
| 11,108,629 B1* | 8/2021 | Cahyadi | G06F 9/45558 |
| 11,360,689 B1* | 6/2022 | Grunwald | G06F 11/108 |
| 11,509,658 B1* | 11/2022 | Kulkarni | H04W 12/60 |
| 2014/0215604 A1* | 7/2014 | Giblin | G06F 21/6218 726/21 |
| 2014/0289207 A1* | 9/2014 | Moloian | G06F 16/2365 707/687 |
| 2014/0359695 A1* | 12/2014 | Chari | G06F 21/604 726/1 |
| 2017/0012965 A1* | 1/2017 | Hurst | H04L 63/0892 |
| 2017/0078322 A1* | 3/2017 | Seiver | H04W 84/005 |
| 2017/0163650 A1* | 6/2017 | Seigel | H04L 63/102 |
| 2017/0242731 A1* | 8/2017 | Xie | G06F 9/5027 |
| 2018/0375886 A1* | 12/2018 | Kirti | H04L 63/1425 |
| 2020/0348984 A1 | 11/2020 | Giannetti et al. | |
| 2021/0075794 A1* | 3/2021 | Gazit | H04L 63/1408 |
| 2021/0084048 A1 | 3/2021 | Kannan et al. | |
| 2021/0281610 A1* | 9/2021 | Applegate-Swanson | H04L 41/22 |
| 2021/0397729 A1* | 12/2021 | McQuaid | G06F 16/13 |

OTHER PUBLICATIONS

Red Hat, Inc., "Red Hat Advanced Cluster Management for Kubernetes 2.2", Apr. 2021, 13 pages.
Github, "Integrity Enforcer", https://github.com/IBM/integrity-enforcer.git. Downloaded Apr. 2, 2021. pp. 1-4.

* cited by examiner

ROLE DESIGN ADVISOR

BACKGROUND

The present invention generally relates to cloud computing security, and more particularly to reducing infiltration risks by adjusting user roles and granted permissions to cloud resources.

Cloud computing relates to the on-demand availability of remote computer system resources, which can include, data storage (e.g., cloud storage) and computing power, without direct active management by the user. Clouds can have operations distributed over multiple locations from one or more central servers. Cloud computing can involve sharing of resources to achieve coherence and economies of scale. Cloud computing can also provide high-capacity networks, low-cost computers and storage devices, as well as hardware virtualization, service-oriented architecture and autonomic and utility computing. Maintenance of cloud computing applications is easier because such applications do not need to be installed on each user's computer and can be accessed from different places (e.g., different work locations, while travelling, etc.). However, there may be no resource boundaries for applications in a physical server, which can cause resource allocation issues.

With server virtualization, many Virtual Machines (VMs) can run on one physical server. There can be a host Operating System (OS) for each physical server and a hypervisor running on top of the host OS. Each application can be run on its own virtual server, where each application can have its own dedicated resources (e.g., CPU, memory, I/O, network configuration, etc.).

Containers are a way of separating an application from the operating system and the physical infrastructure being used. Similar to a VM, a container has its own filesystem, share of CPU power, memory, process space, and more. A software container can be used to isolate different applications, so each application is managed separately and can only access the resources allocated. Each software container and application can be separately secured from other containers and applications.

SUMMARY

In accordance with an embodiment of the present invention, a system for controlling access to cluster resources is provided. The system includes one or more processors; and memory operatively coupled to the one or more processors, wherein the one or more processors and the memory form a cluster of computer resources that includes an admission controller configured to receive requests and determine if the request is authorized, a request history database that stores the request information received by the admission controller from a plurality of users, a role design advisor that is configured to adjust permissions for the plurality of users based on a pattern of usage identified from the request history database, and an alert system that communicates an alert to an administrator that a request outside the pattern of requests for the user has been received by the admission controller, wherein the admission controller, request history database, and role design advisor control access to the cluster resources.

In accordance with another embodiment of the present invention, a computer implemented method of controlling access to cluster resources is provided. The method includes analyzing a request for resources received by an admission controller, wherein analysis of the request identifies a service account associated with a user submitting the request, and the role and rolebinding associated with the user. The method further includes passing the request to a request history database to store the request information, and identifying a pattern of requests submitted by the user over a predetermined period of time. The method further includes adjusting a set of permissions associated with the role of the user to control access to the cluster resources, and sending an alert to an administrator for requests that fall outside the pattern.

In accordance with yet another embodiment of the present invention, a computer program product for controlling access to cluster resources is provided, where the computer program product comprising a computer readable storage medium has program instructions embodied therewith. The program instructions readable by a computer to cause the computer to analyze a request for resources received by an admission controller, wherein analysis of the request identifies a service account associated with a user submitting the request, and the role and rolebinding associated with the user; pass the request to a request history database to store the request information; identify a pattern of requests submitted by the user over a predetermined period of time; adjust a set of permissions associated with the role of the user to control access to the cluster resources; and send an alert to an administrator for requests that fall outside the pattern.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In accordance with embodiments of the present invention, systems and methods are provided for use of an admission controller to record admission requests, identify service accounts and resources identified in the requests, and record which role, role-binding, and/or permission is used in the requests. The admission controller can record who creates/updates roles and role-bindings, and determine which roles/role-bindings/permissions are not actually being used by each user, but are included in the role definition.

Role-based access control (RBAC) is a method of regulating access to computer or network resources based on the roles of individual users within an organization. RBAC authorization uses the rbac.authorization.k8s.io API group to drive authorization decisions, allowing policies to be dynamically configure through the Kubernetes® API (Application Programming Interface).

Hackers and imposters can attempt to utilize a user's role and permissions to access and perform operations that the user normally would not engage in. This would represent an abnormal use of roles and permissions that could be avoided by restricting each users' role and permissions to a minimum set. Reducing permissions and verbs help control access to resources and improve security by minimizing what actions an infiltrator can engage in using a user's role(s).

In various embodiments, abnormal use of permissions for incoming requests can trigger an alarm, for example, when an otherwise unused permission is used for a first time, or whenever the roles are updated by some else.

In various embodiments, alternative definitions of role/role-binding/permission can be computed to provide less privileges, while still allowing all past usages. Role-based access control (RBAC) is a policy-neutral access-control mechanism defined around roles and privileges. The Role-based access control (RBAC) Application Programming Interface (API) can declare four kinds of Kubernetes® objects: Role, ClusterRole, RoleBinding, and ClusterRoleBinding. Objects are persistent entities in the system that represent the state of a cluster, including, what containerized applications are running and on which nodes, the resources available to those applications, and the policies around how those applications behave. Objects, by design, impose access restrictions.

A RBAC Role or ClusterRole contains rules that represent a set of permissions.

Permissions are purely additive; there are no "deny" rules. A Role sets permissions within a particular namespace; when a Role is created, the namespace it belongs to is also specified. A ClusterRole, by contrast, is a non-namespaced resource. The resources have different names (Role and ClusterRole) because a Kubernetes® object has to be either namespaced or non-namespaced. A Kubernetes® object cannot be both. A Role defines the type(s) of access and permissions a user has, which can include custom resource definitions and control actions/commands available to the user. RBAC refers to resources using the same name that appears in the URL for the relevant API endpoint. Default RBAC policies grant scoped permissions to control-plane components, nodes, and controllers, but grant no permissions to service accounts outside the kube-system namespace (beyond discovery permissions given to all authenticated users). This allows particular roles to be granted to particular Service Accounts as needed.

In various embodiments, a Role or ClusterRole can be devised as sub-Roles or sub-ClusterRoles, where multiple Roles of ClusterRoles are defined for a user, and a subset of permissions are assigned to each sub-Role or sub-Cluster-Role to provide finer grained control on permissions. The finer grained control can be used to more accurately determined which permissions for which roles/clusterroles are being used by each user. The sub-Roles or sub-ClusterRoles can be recombined once a user's permissions have been adjusted. Several ClusterRoles can be aggregated into one combined ClusterRole. A ClusterRole can also be converted into a plurality of sub-Roles having a namespace scope, and each sub-Roles assigned a different subset of permissions/verbs for finer grained control and review.

As an Example of a Role or ClusterRole object:
rules:
apiGroups: ["extensions", "apps"]

at the HTTP level, the name of the resource for accessing Deployment
objects is "deployments"
resources: ["deployments"]
verbs: ["get", "list", "watch", "create", "update", "patch", "delete"]

This allows reading/writing Deployments (at the HTTP level: objects with "deployments" in the resource part of their URL) in both the "extensions" and "apps" API groups.

As another Example of a Role or ClusterRole object:
rules:
apiGroups: [" "]

at the HTTP level, the name of the resource for accessing Node
objects is "nodes"
resources: ["nodes"]
verbs: ["get", "list", "watch"]

This allows reading the resource "nodes" in the core group, however because a Node is cluster-scoped, this must be in a ClusterRole bound with a ClusterRoleBinding to be effective.

A RoleBinding or ClusterRoleBinding binds a role to subjects. Subjects can be groups, users or ServiceAccounts.

A role binding (or RoleBinding) grants the permissions defined in a role to a user or set of users. The role binding (or RoleBinding) ties the permissions to the particular user. It holds a list of subjects (users, groups, or service accounts), and a reference to the role being granted. A RoleBinding may reference any Role in the same namespace. Alternatively, a RoleBinding can reference a ClusterRole and bind that ClusterRole to the namespace of the RoleBinding. To bind a ClusterRole to all the namespaces in a cluster, a ClusterRoleBinding can be used.

An admission controller is a piece of code that intercepts requests to the Kubernetes® API server prior to persistence of the object, but after the request is authenticated and authorized. An admission controller can provide metrics of usage coverage, and use a reduction of privileges to guide decisions. Alternative role/role-bindings/permissions could be merged/divided/scope-narrowed for better coverage with less privileges. Narrower role scopes can provide finer access control and improved security compared to broad role and cluster role definitions.

Kubernetes® can provide a framework to run distributed systems resiliently, where it can handle scaling and failover for applications. Kubernetes® operates at the container level rather than at the hardware level. By grouping together machines (physical or virtual servers referred to as "nodes") running the containerized apps (applications), a cluster is created, which can then be managed and orchestrated with Kubernetes®. A Kubernetes® cluster can have the ability to schedule and run containers across a group of machines. When an administrator or superuser creates a cluster, they configure the authorization modules that should be used in the API server, for example, Attribute-Based Access Control (ABAC) mode, Role-based access control (RBAC) mode, and Webhook mode. Admission Control modules are software modules that can modify or reject requests. In addition to the attributes available to Authorization modules, Admission Control modules can access the contents of the object that is being created or modified. Unlike Authentication and Authorization modules, if any admission controller module rejects, then the request is immediately rejected.

A Kubernetes® cluster can include a set of worker machines, called nodes or worker nodes, that run containerized applications. Each cluster can have at least one worker node that can execute container(s). A cluster includes a control plane and an application plane with the one or more nodes. The control plane is responsible for maintaining the desired state of the cluster, such as which applications are running and which container images they use. The control plane can run across multiple computers or virtual machines (VMs). A node controller is a control plane component that manages various aspects of nodes. Nodes actually run the applications and workloads. A node may be a virtual or physical machine, depending on the cluster. Node resources can include, CPU, memory, and the maximum number of pods that can be scheduled onto the node.

A group of containers running on a single machine or node, and sharing resources, is referred to as a "pod", whereas a pod having a single container would simply be referred to as a "container." The control plane manages the worker nodes and the pods in the cluster.

A Kubernetes® cluster has a desired state, which defines which applications or other workloads should be running, along with which images the workloads use, which resources should be made available for them, as well as other configuration details. A desired state is defined by configuration files made up of manifests, which can be JSON or YAML files.

A cluster control plane's components can make global decisions about the cluster, for example, scheduling, as well as detecting and responding to cluster events, for example, starting up a new pod. The Kubernetes® API is the front end of the Kubernetes® control plane and is how users interact with their Kubernetes® cluster. An API (application programming interface) server is a component of the Kubernetes® control plane that exposes the Kubernetes® API. An API server can be the front end for a Kubernetes® control plane. The API server determines if a request is valid and then processes it. Cluster control plane components can all be on the same machine, which may not run user containers.

Requests can include a request verb, for example, create, get, list, watch, update, patch, escalate, and delete. HTTP verbs can be, for example, Post, Get, Head, Put, Patch, and Delete. The verbs act on an individual resource or a collection of resources.

A cloud controller manager can link a cluster into a cloud provider's API, and separate out components that interact with the cloud platform from components that only interact with the cluster. The API server can provide an HTTP API that lets end users, different parts of the cluster, and external components communicate with one another. A controller, running as part of the cluster control plane, watches for ClusterRole objects.

Designing and maintaining Kubernetes® roles are used to establish a solid security baseline for securing the cluster, and it is one of the key controls for meeting regulatory requirements. Role-based access control (RBAC) is a method of regulating access to computer or network resources based on the roles of individual users within your organization. RBAC authorization uses the rbac.authorization.k8s.io API group to drive authorization decisions, allowing dynamically configured policies through the Kubernetes® API.

It can be difficult to design proper roles with LEAST privileges because it can be difficult to understand the detail access patterns of application, and easy to define loose conditions. For example, a user granted permission to create pods (or controllers that create pods) in the namespace can: read all secrets in the namespace; read all config maps in the namespace; and impersonate any service account in the namespace and take any action the account could take. This applies regardless of authorization mode. An infiltrator can usurp these permissions and use them for improper purposes, where the actual user may not have needed such permissions in the first place.

Kubernetes® clusters can have two categories of users: service accounts managed by Kubernetes®, and normal users. Kubernetes® does not have objects which represent normal user accounts. Normal users cannot be added to a cluster through an API call. The role-based access control (RBAC) sub-system would determine whether the user is authorized to perform a specific operation on a resource. Service accounts are users managed by the Kubernetes® API. They are bound to specific namespaces, and created automatically by the API server or manually through API calls. Service accounts are tied to a set of credentials stored as Secrets, which can be mounted into pods allowing in-cluster processes to talk to the Kubernetes® API. A Secret is an object that contains a small amount of sensitive data such as a password, a token, or a key. A service account also provides an identity for processes that run in a Pod. Each namespace has a default service account resource called "default."

The REST API is the fundamental fabric of Kubernetes®. All operations and communications between components, and external user commands are REST API calls that the API Server handles. Workloads are objects you use to manage and run your containers on the cluster. Cluster resources objects define how the cluster itself is configured; these are typically used only by cluster operators.

A Cluster-Role can be used to grant the same permissions as a Role. Because ClusterRoles are cluster-scoped, they can be used to grant access to cluster-scoped resources (e.g., nodes), non-resource endpoints (e.g., /healthz), and/or namespaced resources (e.g., Pods), across all namespaces.

A role binding grants the permissions defined in a role to a user or set of users. It holds a list of subjects (users, groups, or service accounts), and a reference to the role being granted. A Role-Binding grants permissions within a specific namespace whereas a Cluster-Role-Binding grants that access cluster-wide. A Role-Binding may reference any Role in the same namespace. Alternatively, a Role-Binding can reference a Cluster-Role and bind that Cluster-Role to the namespace of the Role-Binding. If you want to bind a Cluster-Role to all the namespaces in your cluster, you use a Cluster-Role-Binding. The name of a Role-Binding or Cluster-Role-Binding object must be a valid path segment name.

A Role-Binding can also reference a Cluster-Role to grant the permissions defined in that Cluster-Role to resources inside the Role-Binding's namespace. This kind of reference lets you define a set of common roles across your cluster, then reuse them within multiple namespaces. To grant permissions across a whole cluster, you can use a Cluster-Role-Binding.

In the Kubernetes® API, most resources are represented and accessed using a string representation of their object name, such as pods for a Pod. RBAC refers to resources using exactly the same name that appears in the URL for the relevant API endpoint. Some Kubernetes® APIs involve a sub-resource, such as the logs for a Pod.

It is possible to run programs within containers, to which only a subset of computer resources is allocated. A program run inside a container can only see the resources allocated to the particular container, and believes these resources to be all that is available. Several containers can be created on each operating system, to each of which a subset of the computer's resources can be allocated. Each container may contain any number of computer programs. These programs may run concurrently or separately, and may even interact with one another.

It is to be understood that aspects of the present invention will be described in terms of a given illustrative architecture; however, other architectures, structures, components, and process features and steps can be varied within the scope of aspects of the present invention.

Figure 1:
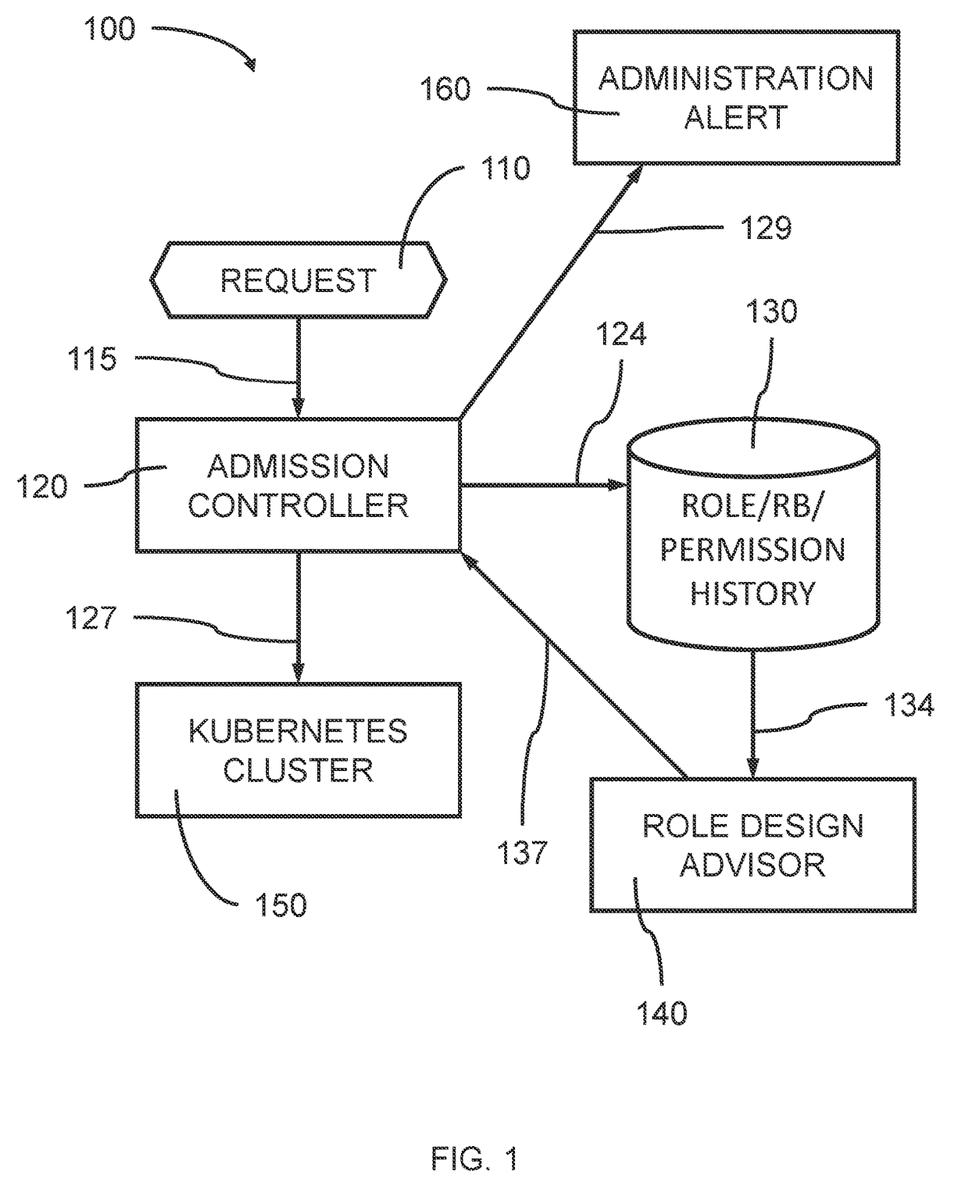
FIG. 1 is a block/flow diagram showing a high-level system/method for admission control and role design, in accordance with an embodiment of the present invention.

Referring now in detail to the figures in which like numerals represent the same or similar elements and initially to FIG. 1, a high-level system/method for admission control and role design is illustratively depicted in accordance with an embodiment of the present invention.

In various embodiments, a platform 100 for managing containerized workloads and services, for example, Kubernetes®, can receive a request 110 submitted by a user to access a service account (SA) and a resource, for example, a cluster or pod. A Request 110 can include service account, a subject, used in the link between the service account and resource, a Role-Binding or Cluster-Role-Binding, (also in the link), permissions, and a resource identifier that identifies the resource. A time stamp can also be included or attached to the request 110 by an Admission Controller 120.

In various embodiments, the request is fed 115 to an Admission Controller 120 that intercepts the input request 110 and examines the request to determine who is making the request. The Admission Controller 120 can determine the role, rolebinding, and/or permission(s) being utilized in the request. The Admission Controller 120 can search for and identify a link between a service account (SA) and a resource, for example, in the Kubernetes® Cluster 150 on the system 100, based on a rolebinding. If a link between the service account (SA) and the requested resource is found in the cluster 150, the request 110 is approved for the user. The Admission Controller 120 also passes 124 the request 110 to a Request History Database 130 that stores the requests submitted by each user to track the user's requests and permission usage history.

In various embodiments, the Request History Database 130 updates the usage history for each specific user when they submit a request 110, where the request record for each user can be stored as an access log. Each request 110 can produce an entry in the access log identifying a particular user and the type of permission/verb submitted in the request. Each entry in the Request History Database 130 then corresponds to each request 110, which can include identification of a service account (SA) and resource (e.g., cluster, pod, node, etc.).

In various embodiments, the Request History Database 130 can store the history of each user's submitted verbs and permission usage to track which permissions from a user's role have been utilized by the user making a request 110. The identified link between the SA and the resource can be saved in the Request History Database 130. Storage of the submitted requests can build a history over a period of time, that can be analyzed to determine which permissions granted to the user are most often submitted in requests and which permissions are not used at all during the period. The submitted requests 110 and permissions can be identified with the user making the request, and stored for each user listed/identified/granted permissions on a system platform 100.

In various embodiments, the usage period can be defined by an administrator or superuser, for example, as a day, a week, a month, a quarter (i.e., 3 months), a half year (i.e., 6 months), etc. The usage period can be determined based on the number of requests made by the user(s) during the time periods, such that a statistical analysis with a threshold level of confidence can be calculated from each user history. For example, a threshold number of requests in a predetermined usage period can be, for example, 100 requests, 500 requests, 1,000 requests, 2,500 requests, 5,000 requests, etc. In various embodiments, the threshold number of requests for a usage period can be in a range of about 100 requests to about 10,000 requests, or about 100 requests to about 1,000 requests, or about 500 requests to about 5,000 requests (per defined time period), although other ranges are also contemplated. This can provide metrics of usage coverage, and identify reduction of privileges to guide decisions.

In various embodiments, the usage history for a user can be passed 134 from the Request History Database 130 to a Role Design Advisor 140 that can be configured to determine pattern(s) of Requests submitted by the same user over a predetermined time period, and adjust the permissions assigned in a role for that particular user based on the pattern(s). The adjustment to the permissions can be based on the statistics calculated from the usage history for that user and role. Keeping track of role binding by the Request History Database 130 can allow the identification of utilization patterns by the users; and the Role Design Advisor 140 can assess whether a user has unused permissions by examining past request logs. The lack of use of the specific permission by the particular user can indicate that the particular user has no need for the unused permission, and the role for the user is overly broad.

In various embodiments, the Role Design Advisor 140 can delete a permission/verb from a role for a user, when the permission has not been used at all during the predetermined time period. Removal of the permission and access to one or more verb(s) can increase the system integrity and improve system security by not allowing usage of the particular permission(s) by an impostor or other system infiltrator that may gain access to the user role. By reducing permissions assigned to a role, less access to the system 100 may be obtained by an infiltrator.

In various embodiments, the Role Design Advisor 140 can identify permission(s) that are very infrequently utilized by a user, for example, in less than 5%, or less than 3%, or less than 1% of the submitted requests by the user over the time period, and remove the permission until the particular user makes a formal requests for reinstitution of the specific permission. Such restrictions can prevent usage of a permission that was being utilized by an infiltrator over the time period, so showed activity in the Request History Database 130, but was not activity engaged in by the particular user.

In various embodiments, the Role Design Advisor 140 can provide 137 an updated role definition (or Role Key) to the Admission Controller 120 for analysis of future requests 110 by each user. The Role Design Advisor 140 can compute an alternative definition of a role/role-binding/permission to provide fewer privileges, but still cover all past usages. This alternative definition can be a key that unlocks a least set of privileges. The Admission Controller 120 can reject requests 110 that include the permission/verbs deleted by the Role Design Advisor 140, where the alternative definition does not grant the permission or access to the requested resource. Rejected requests 110 can also be stored by the Request History Database 130.

In various embodiments, the Admission Controller 120 can grant access to the resource(s) in the submitted request 110 that includes a link between the service account and the identified resource, and has authorized permissions for the role assigned/associated with the user. The Kubernetes® Cluster 150 can provide the requested resource and/or perform the verb included in the request on such resources once permission is authorized by the Admission Controller 120.

In various embodiments, the Admission Controller 120 can transmit 129 an alert 160 using an alert system 165 to an administrator or superuser that a request has attempted to utilize a permission/verb or resource that has not been granted to the particular user, or that the request 110 has attempted to utilize a granted permission/verb or resource that is outside the particular user's pattern of usage for a predetermined time period. In some instances, the permission/verb may not have been used at all in the time period, or has been used infrequently enough based on user statistics, that it can be considered an abnormality.

Figure 2:
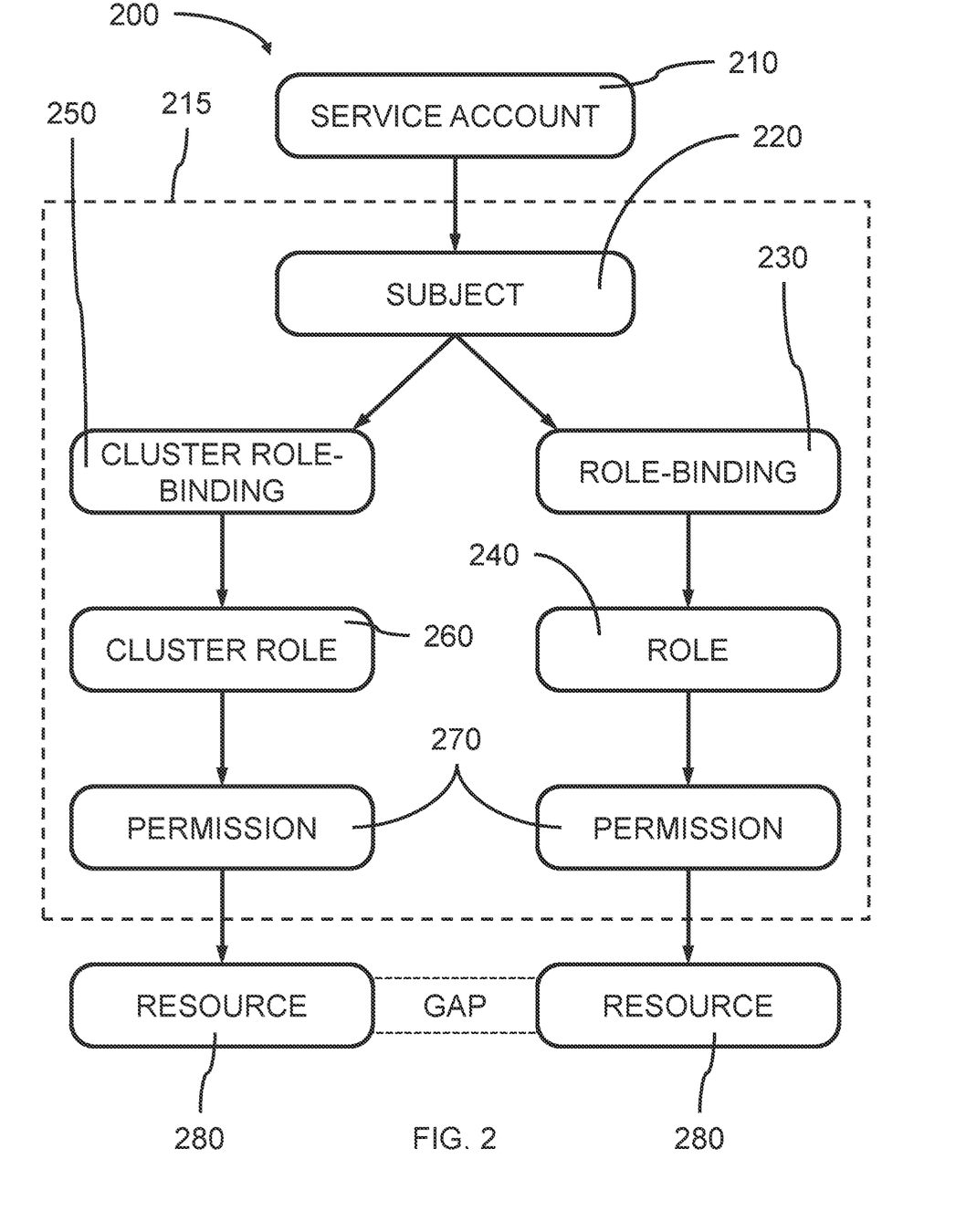
FIG. 2 is a block/flow diagram showing a system/method for request authorization, role design and permission adjustment, in accordance with an embodiment of the present invention.

FIG. 2 is a block/flow diagram showing a system/method for request authorization, role design and permission adjustment, in accordance with an embodiment of the present invention.

In various embodiments, when a user attempts to access a resource 280 (e.g., a cluster, pod, etc.), the user is authenticated by the Admission Controller 120, and authenticated as a particular Service Account (for example, "default"). When a user creates a pod, if a service account is not specified, it is automatically assigned the "default" service account in the same namespace. A request can identify a service account 210 and a resource 280, where the service account can identify a subject 220, including a "kind", a "name", an "apigroup", and/or a "namespace", and a resource 280. A Request 110 can include the service account 210, a subject 220, used in the link between the service account and resource, a Role-Binding 230 or Cluster-Role-Binding 250 (also in the link), a Role 240 of Cluster Role 260, permissions 270, and the identifier for the resource 280. The Admission Controller 120 derives the subject, and the RoleBinding (RB)/Cluster-RB, and permissions are derived from the service account 210 and resource 280 in each request 110.

A list of subjects 220 (users, groups, or service accounts) is checked.

As an Example for service accounts in a "Dev" Group:

```
subjects:
- kind: Group
  name: system:serviceaccounts:dev
  apiGroup: rbac.authorization.k8s.io
  namespace: development
```

A RoleBinding 230 binds a Role 240 to the subjects 220, or a ClusterRoleBinding 250 binds a ClusterRole 260 to the subjects 220 depending on whether permissions 270 are within a particular namespace (for a Role) or a non-namespaced resource for a ClusterRole. Roles 240 and ClusterRoles 260 are objects that contain rules that represent a set of permissions 270.

For example, a Role in the "default" namespace that can be used to grant read access to pods:

```
apiVersion: rbac.authorization.k8s.io/v1
kind: Role
metadata:
  namespace: default
  name: pod-reader
rules:
- apiGroups: [""] # "" indicates the core API group
  resources: ["pods"]
  verbs: ["get", "watch", "list"]
```

A role binding or cluster role binding grants the permissions defined in the role or cluster role to a user or set of users.

For example: the following ClusterRoles let the "admin" and "edit" default roles manage the custom resource named CronTab, whereas the "view" role can perform only read actions on CronTab resources. You can assume that CronTab objects are named "crontabs" in URLs as seen by the API server.

```
apiVersion: rbac.authorization.k8s.io/v1
kind: ClusterRole
metadata:
  name: aggregate-cron-tabs-edit
  labels:
    # Add these permissions to the "admin" and "edit" default roles.
    rbac.authorization.k8s.io/aggregate-to-admin: "true"
    rbac.authorization.k8s.io/aggregate-to-edit: "true"
rules:
- apiGroups: ["stable.example.com"]
  resources: ["crontabs"]
  verbs: ["get", "list", "watch", "create", "update", "patch", "delete"]
---
kind: ClusterRole
apiVersion: rbac.authorization.k8s.io/v1
metadata:
  name: aggregate-cron-tabs-view
  labels:
    # Add these permissions to the "view" default role.
    rbac.authorization.k8s.io/aggregate-to-view: "true"
rules:
- apiGroups: ["stable.example.com"]
  resources: ["crontabs"]
  verbs: ["get", "list", "watch"]
```

In various embodiments, the request and which role, rolebinding, and/or permission are utilized 215 in the request can be recorded. The administrator or superuser that created the role(s) and/or rolebinding(s) (clusterrole/clusterrolebinding) can also be recorded, which can be used to keep track of modifications and updates.

At each start-up, the API server can update default cluster roles with any missing permissions, and update default cluster role bindings with any missing subjects. This allows the cluster to repair accidental modifications, and helps to keep roles and role bindings up-to-date as permissions and subjects change.

Figure 3:
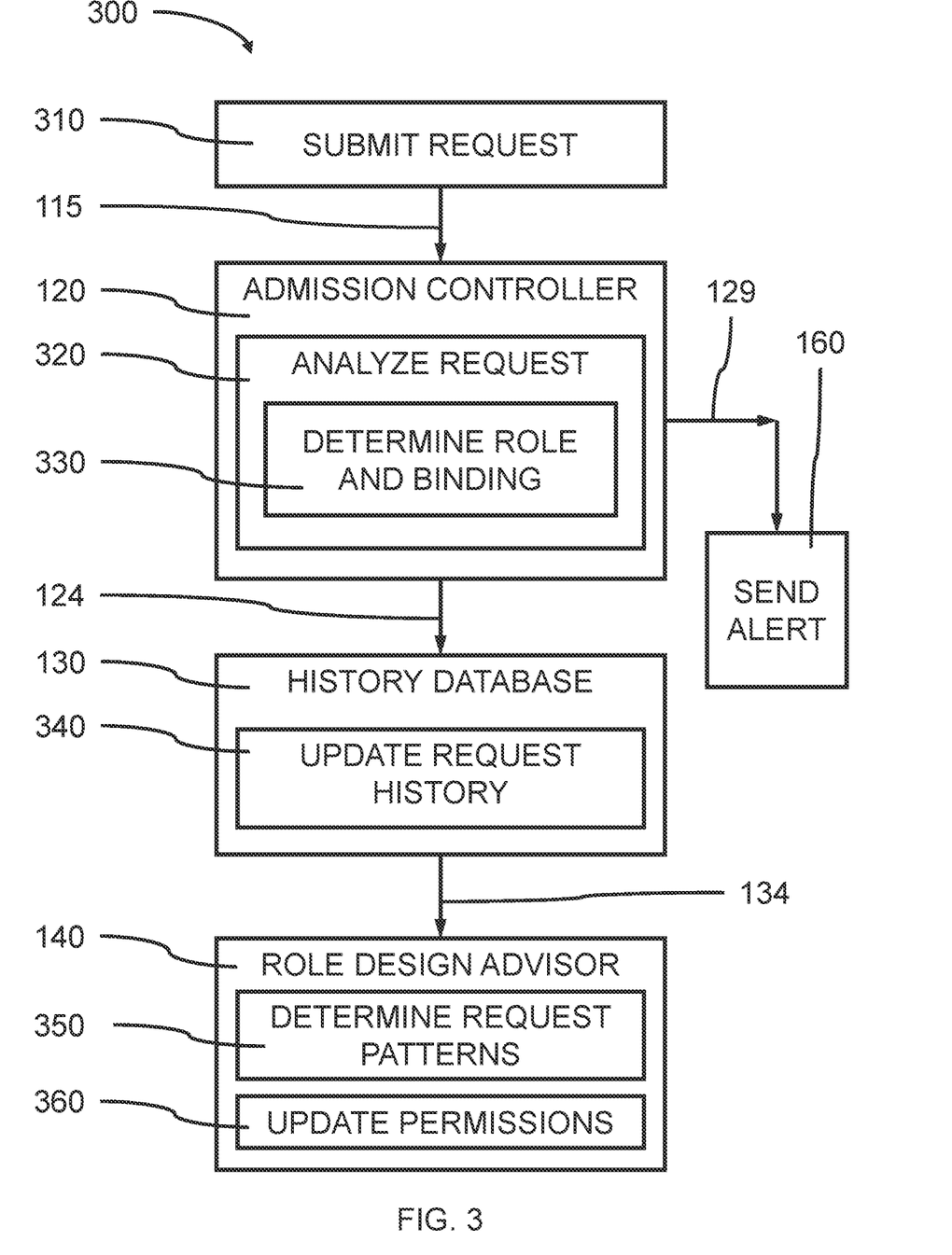
FIG. 3 is a block/flow diagram showing a method for request analysis, permission history updating, and alerting, in accordance with an embodiment of the present invention.

FIG. 3 is a block/flow diagram showing a method for request analysis, permission history updating, and alerting, in accordance with an embodiment of the present invention.

At block 310, a Request 110 is submitted 310 by a user to an Admission Controller 120, which receives the Request and determines if the Request is authorized.

At block 320, the Admission Controller 120 analyzes the Request 110 to determine if the user is authorized to access and/or use the resources identified in the Request. Authorization is determined based on the Role or ClusterRole and the RoleBinding or ClusterRoleBinding assigned to the user submitting the request.

At block 330, the Admission Controller 120 determines whether the permissions identified in the request are bound to the Role or Cluster Role through the appropriate binding. The determination can be in reference to a Role, ClusterRole, or an updated role/clusterrole definition (or Role Key) provided by the Role Design Advisor 140.

At 124 the request 110 is passed to the Request History Database 130.

At block 340, the Request History Database 130 updates the Request History of the user that submitted the request. The Request History Database 130 can keep track of role bindings and cluster role bindings.

At 134, the usage history for a user can be passed from the Request History Database 130 to a Role Design Advisor 140 to allow the identification of user utilization patterns.

At block 350, the Role Design Advisor 140 can determine patterns of Requests 110 submitted by the same user over a predetermined time (usage) period. The patterns can be determined by identifying the most used roles, rolebindings, permissions, and verbs utilized by the user during the predetermined time period, and the roles, rolebindings, permissions, and verbs not utilized at all by the user during the same predetermined time period.

At block 360, the Role Design Advisor 140 uses the patterns of the user's usage history to determine whether any permissions should be removed from the user's list of permissions/verbs. The usages can be statistically analyzed to establish a confidence level that the used roles, rolebindings, permissions, and verbs will continue to be used and the unused roles, rolebindings, permissions, and verbs will not be utilized by the user in the future. The unused roles, rolebindings, permissions, and/or verbs with a high likelihood of remaining unused can be deleted from the user's granted roles, rolebindings, permissions, and verbs. In various embodiments, any roles, rolebindings, permissions, and/or verbs that were unused in the preceding time period can be deleted. A user may then have to request reinstatement of the deleted roles, rolebindings, permissions, and/or verbs when a need arises.

Figure 4:
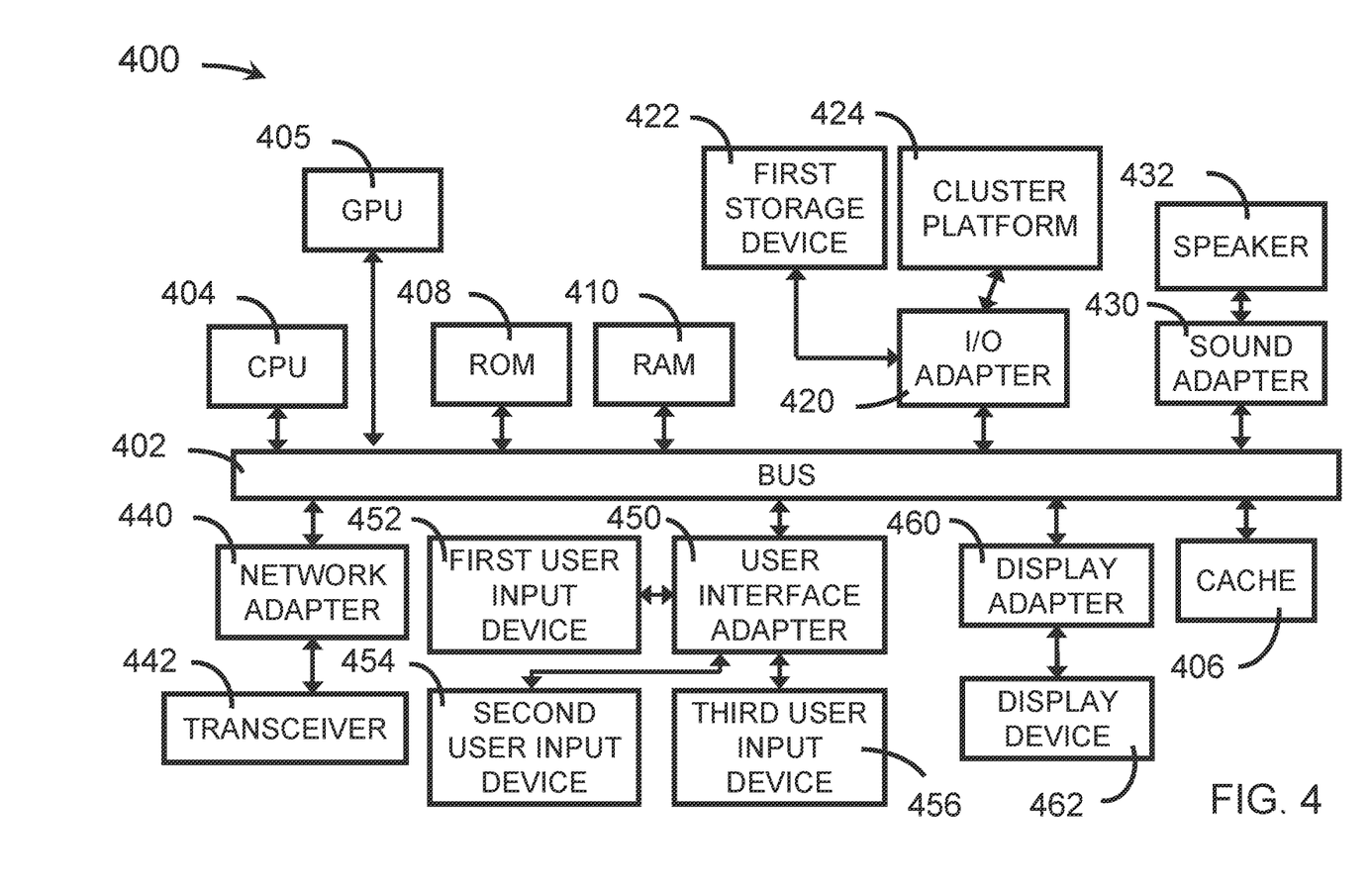
FIG. 4 is an exemplary processing system to which the present methods and systems may be applied, in accordance with an embodiment of the present invention.

FIG. 4 is an exemplary processing system 400 to which the present methods and systems may be applied, in accordance with an embodiment of the present invention.

The processing system 400 can include at least one processor (CPU) 404 and may have a graphics processing (GPU) 405 that can perform vector calculations/manipulations operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and/or a display adapter 460, can also be operatively coupled to the system bus 402.

A first storage device 422 and a second storage device 424 are operatively coupled to system bus 402 by the I/O adapter 420, where a platform 100 for managing containerized workloads and services can be stored for implementing the features described herein. The storage devices 422 and 424 can be any of a disk storage device (e.g., a magnetic or optical disk storage device), a solid state storage device, a magnetic storage device, and so forth. The storage devices 422 and 424 can be the same type of storage device or different types of storage devices.

A speaker 432 can be operatively coupled to the system bus 402 by the sound adapter 430. A transceiver 442 can be operatively coupled to the system bus 402 by the network adapter 440. A display device 462 can be operatively coupled to the system bus 402 by display adapter 460.

A first user input device 452, a second user input device 454, and a third user input device 456 can be operatively coupled to the system bus 402 by the user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 can be used to input and output information to and from the processing system 400.

In various embodiments, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that system 400 is a system for implementing respective embodiments of the present methods/systems. Part or all of processing system 400 may be implemented in one or more of the elements of FIGS. 1-3. Further, it is to be appreciated that processing system 400 may perform at least part of the methods described herein including, for example, at least part of the method of FIGS. 1-3.

Figure 5:
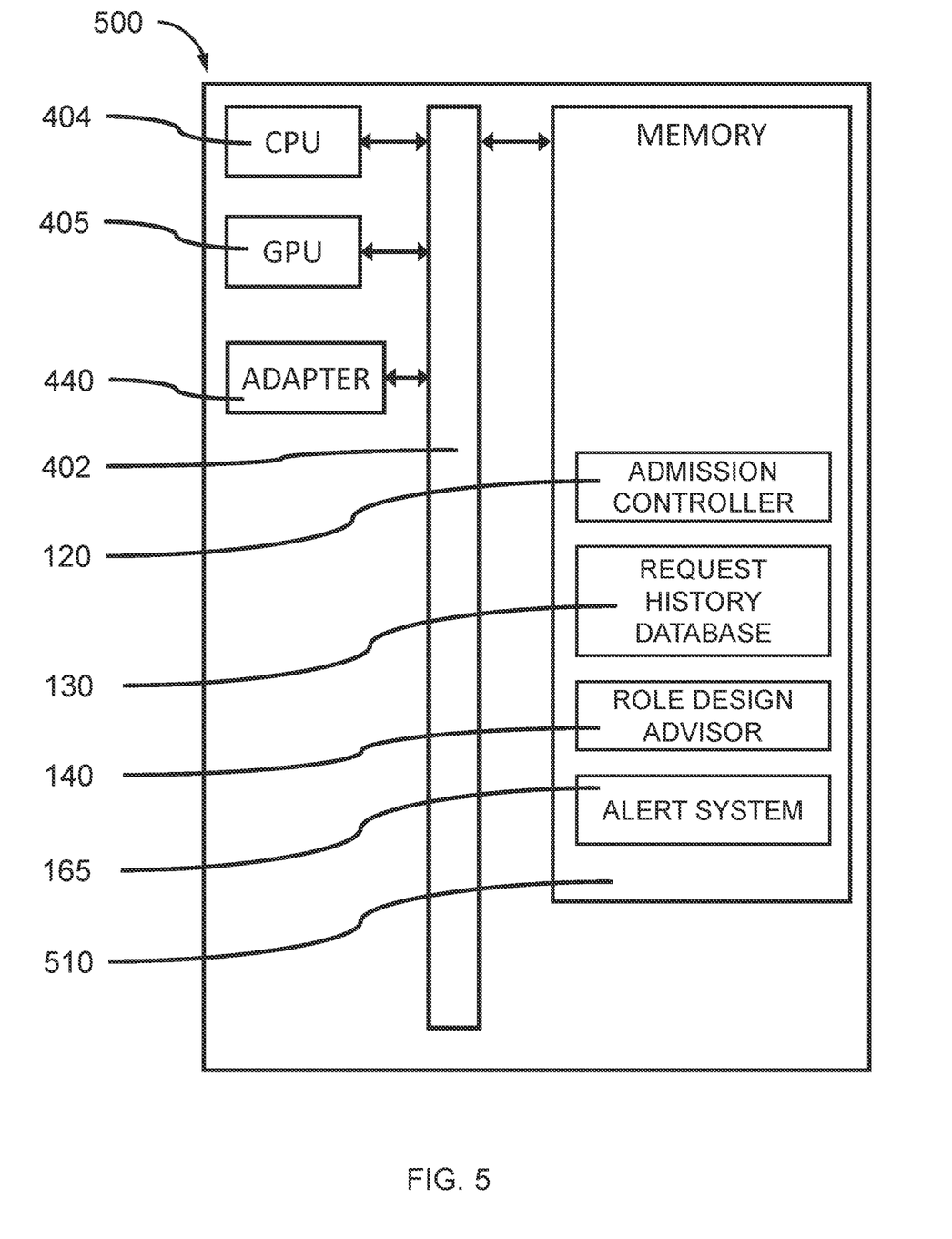
FIG. 5 is an exemplary computing system configured to implement an Admission Controller, a Request History Database, a Role Design Advisor, and an Alert System for a cluster, in accordance with an embodiment of the present invention.

FIG. 5 is an exemplary computing system configured to implement an Admission Controller, a Request History Database, a Role Design Advisor, and an Alert System for a cluster, in accordance with an embodiment of the present invention.

In one or more embodiments, the computer system 500 can be a processing system 400 configured to perform a computer implemented method of managing containerized workloads and services, for example, Kubernetes®.

In one or more embodiments, the computer system 500 can be a processing system 400 having memory components 510, including, but not limited to, the computer system's random access memory (RAM) 410, hard drives 422, and/or cloud storage to store and implement a computer implemented method of managing containerized workloads and services. The memory components 510 can also utilize a database for organizing the memory storage.

In various embodiments, the memory components 510 can include an Admission Controller 120 that can be configured to analyze submitted user requests. The Admission Controller 120 can be configured to receive as input a Kubernetes® Request and determine if the user submitting the Request is properly authorized.

In various embodiments, the memory components 510 can include a Request History Database 130 that is configured to store the history of requests from each user, and store the information relating to the roles, bindings, and permissions/verbs assigned to each user and their usage over time, as well as the service accounts 210, subjects 220, and resources identified in the requests.

In various embodiments, the memory components 510 can include a Role Design Advisor 140 that can alter roles, bindings, and permissions of a user. The Role Design Advisor 130 can be configured to identify usage patterns from the user history and adjust permissions/verbs based on the usage patterns. The admission controller 120, request history database 130, and role design advisor 140 can control access to the cluster resources by adjusting the permissions/verbs and blocking requests at the Admission Controller 120 that include permissions/verbs that are not authorized.

In various embodiments, the memory components 510 can include an Alert System 165 that triggers an alert 160 to an administrator or superuser when a user request includes permissions/verbs that appear abnormal to the user's historical pattern of requests. The Alert System 165 can be configured to notify a system administrator or superuser through wireless and/or electronic communication paths (e.g., email, text messages, phone call alert, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
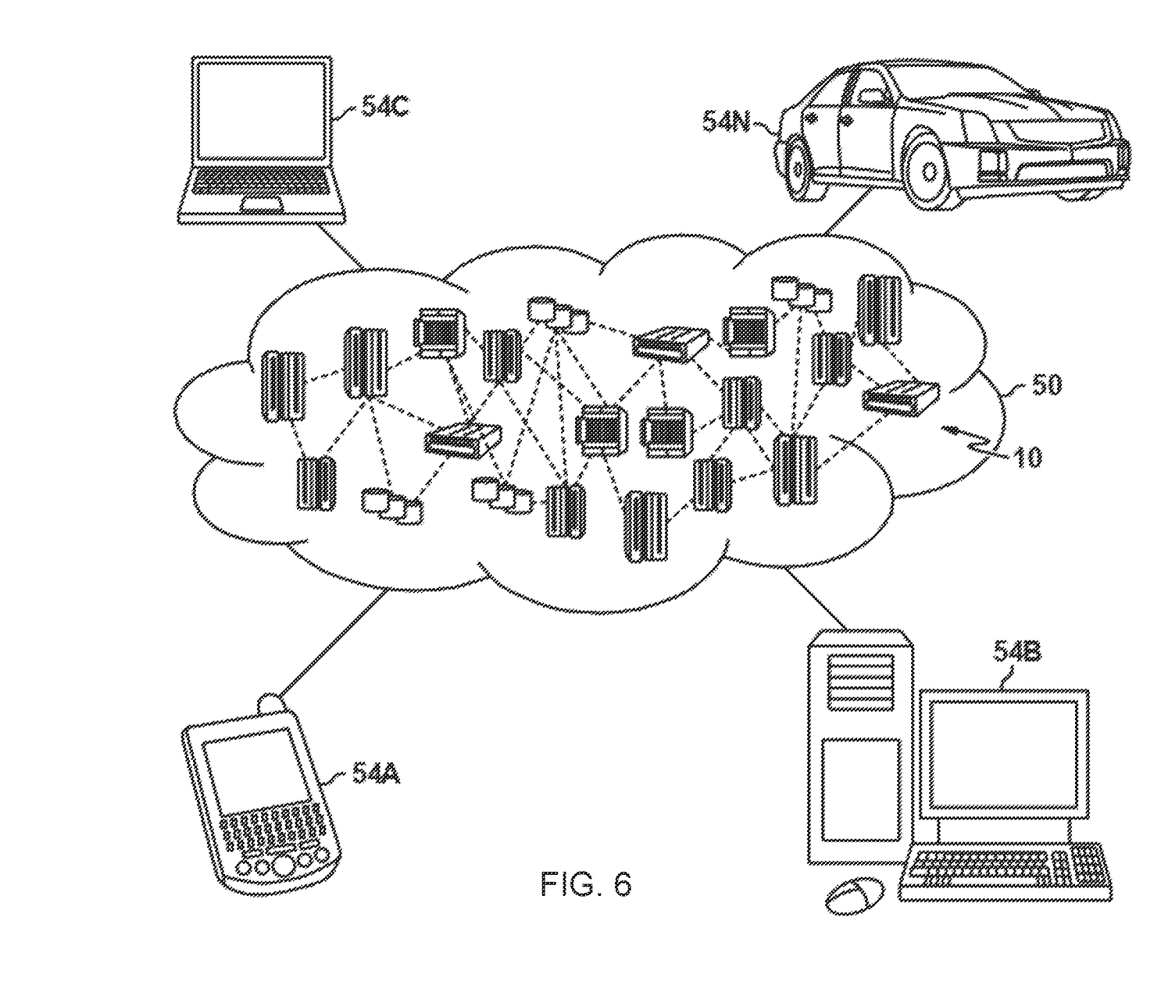
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
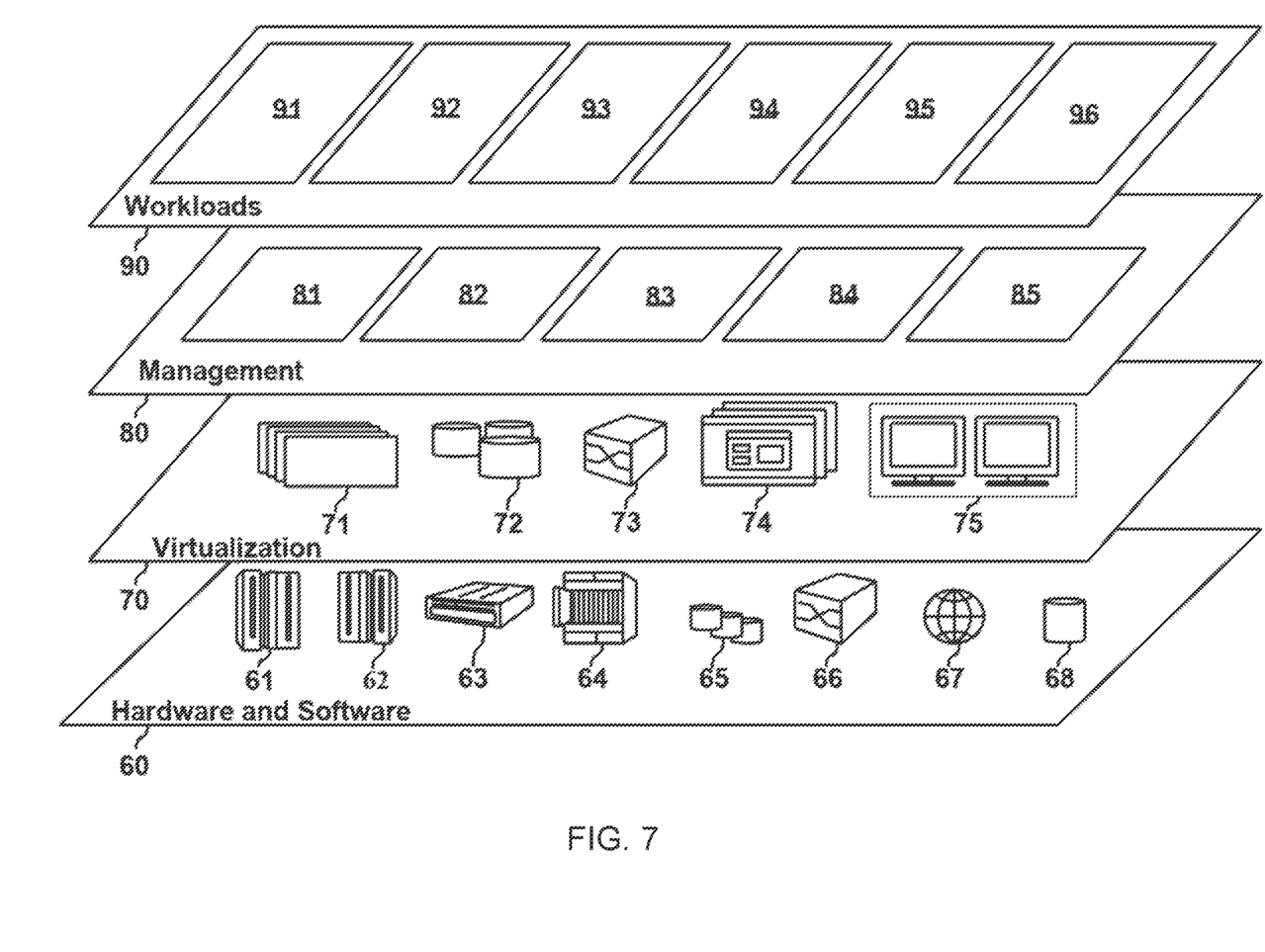
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. In various embodiments, the management layer can be a Kubernetes® platform that manages these resources 81, 82, 83, 84, 85, and provides the features and elements described herein to manage the resources.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and elements of the Kubernetes® Platform 96 forming clusters, pods, and application instances.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for controlling access to cluster resources, comprising:
    a memory operatively coupled to one or more processors, the one or more processors and the memory forming a cluster of computer resources, comprising:

an admission controller configured for intercepting and receiving requests to an Application Programming Interface (API) responsive to determining whether the requests are authorized using a dynamic role-based access control mechanism;

a request history database configured for storing information from the requests received by the admission controller from one or more users from a plurality of users;

a role design advisor configured for dynamically adjusting permissions and assigning, using rolebinding, a role for the one or more users based on a pattern of usage identified from the request history database; and an alert system configured for communicating an alert to an administrator that a request outside the pattern of usage from the request history for the one or more users has been received by the admission controller, wherein the admission controller controls access to the cluster resources by the one or more users based on permissions defined in the role assigned for the one or more users by the role-binding.

2. The system of claim 1, wherein the request information stored by the request history database includes the role of the one or more users, a rolebinding, and permissions associated with the role.

3. The system of claim 2, wherein the request also identifies a service account, subject and a resource identifier.

4. The system of claim 1, wherein the cluster of computer resources is configured to fulfill a request received by the admission controller that has been determined to be authorized.

5. The system of claim 4, further comprising a control plane that maintains a state of the cluster of computer resources.

6. The system of claim 1, wherein the role design advisor is further configured to identify the pattern of usage for a predetermined time period.

7. The system of claim 6, wherein the pattern of usage is identified based on a threshold number of requests submitted in a predetermined usage period.

8. A computer implemented method for controlling access to cluster resources, comprising:

intercepting, receiving, and analyzing a request for resources to an Application Programming Interface (API), using an admission controller, responsive to determining whether the request is authorized using a dynamic role-based control mechanism, wherein analysis of the request identifies a service account associated with a user submitting the request, and a role and rolebinding associated with the user;

passing the request to a request history database to store information from the request;

identifying a pattern of requests submitted by the user over a predetermined period of time;

dynamically adjusting a set of permissions associated with the role of the user, and assigning, using the rolebinding, a role for the user based on the identified pattern of requests to control access to the cluster resources by the admission controller based on the adjusted set of permissions associated with the role of the user; and sending an alert to an administrator for requests that fall outside the pattern of requests by the user.

9. The computer implemented method of claim 8, wherein the information from the request stored by the request history database includes the user role, the rolebinding, and the permissions associated with the role.

10. The computer implemented method of claim 9, wherein the request also identifies a service account, subject and a resource identifier.

11. The computer implemented method of claim 8, wherein the pattern of usage is identified for a predetermined time period.

12. The computer implemented method of claim 11, wherein the pattern of usage is determined based on a threshold number of requests submitted in a predetermined usage period.

13. The computer implemented method of claim 12, wherein the set of permissions associated with the role of the user is adjusted by deleting permissions that have not been used during the predetermined usage period.

14. The computer implemented method of claim 13, wherein the alert is sent a first time a permission is utilized in a request by the user.

15. A computer program product for controlling access to cluster resources, the computer program product comprising a computer readable storage medium having program instructions embodied therewith, the program instructions readable by a computer to cause the computer to:

intercept, receive, and analyze a request for resources to an Application Programming Interface (API), using an admission controller, responsive to determining whether the request is authorized using a dynamic role-based control mechanism, wherein analysis of the request identifies a service account associated with a user submitting the request, and a role and rolebinding associated with the user;

pass the request to a request history database to store information from the request;

identify a pattern of requests submitted by the user over a predetermined period of time;

dynamically adjust a set of permissions associated with the role of the user, and assign, using the rolebinding, the role for the user based on the identified pattern of requests to control access to the cluster resources by the admission controller based on the adjusted set of permissions associated with the role of the user; and send an alert to an administrator for requests that fall outside the pattern of requests by the user.

16. The computer program product of claim 15, wherein the request information stored by the request history database includes the user role, the rolebinding, and permissions associated with the role.

17. The computer program product of claim 16, wherein the request also identifies a service account, subject and a resource identifier.

18. The computer program product of claim of claim 15, wherein the pattern of usage is identified for a predetermined time period.

19. The computer program product of claim 18, wherein the pattern of usage is determined based on a threshold number of requests submitted in a predetermined usage period.

20. The computer program product of claim 19, wherein the set of permissions associated with the role of the user is adjusted by deleting permissions that have not been used during the predetermined usage period.

* * * * *